No. 12,505. REISSUED JULY 17, 1906.

J. H. BARR.

POSTMARKING AND STAMP CANCELING MACHINE.

APPLICATION FILED SEPT. 30, 1897.

5 SHEETS—SHEET 1.

Witnesses
J. Grant Culverwell.
Arthur L. Bryant.

Inventor
John H. Barr
By H. H. Blise
Attorney

No. 12,505. REISSUED JULY 17, 1906.

J. H. BARR.

POSTMARKING AND STAMP CANCELING MACHINE.

APPLICATION FILED SEPT. 30, 1897.

5 SHEETS—SHEET 2.

Witnesses
J. Frank Culverwell.
Arthur L. Bryant.

Inventor
John H. Barr
By H. H. Bliss
Attorney

No. 12,505. REISSUED JULY 17, 1906.
J. H. BARR.
POSTMARKING AND STAMP CANCELING MACHINE.
APPLICATION FILED SEPT. 30, 1897.
5 SHEETS—SHEET 3.
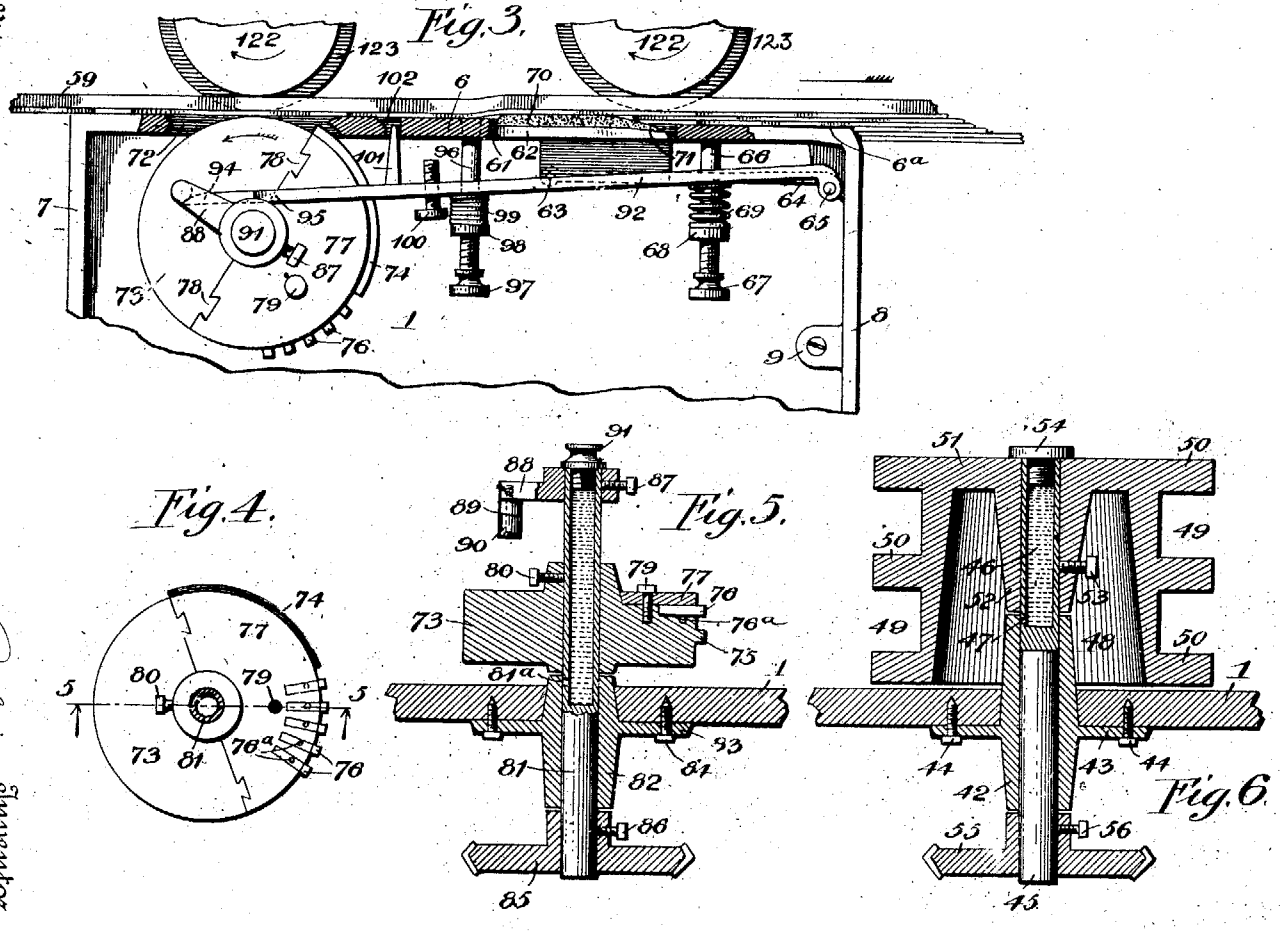
Witnesses
J. Frank Culverwell
Arthur L. Bryant
Inventor
John H. Barr
By H. H. Bliss
Attorney No. 12,505. REISSUED JULY 17, 1906.
J. H. BARR.
POSTMARKING AND STAMP CANCELING MACHINE.
APPLICATION FILED SEPT. 30, 1897.
5 SHEETS—SHEET 4.
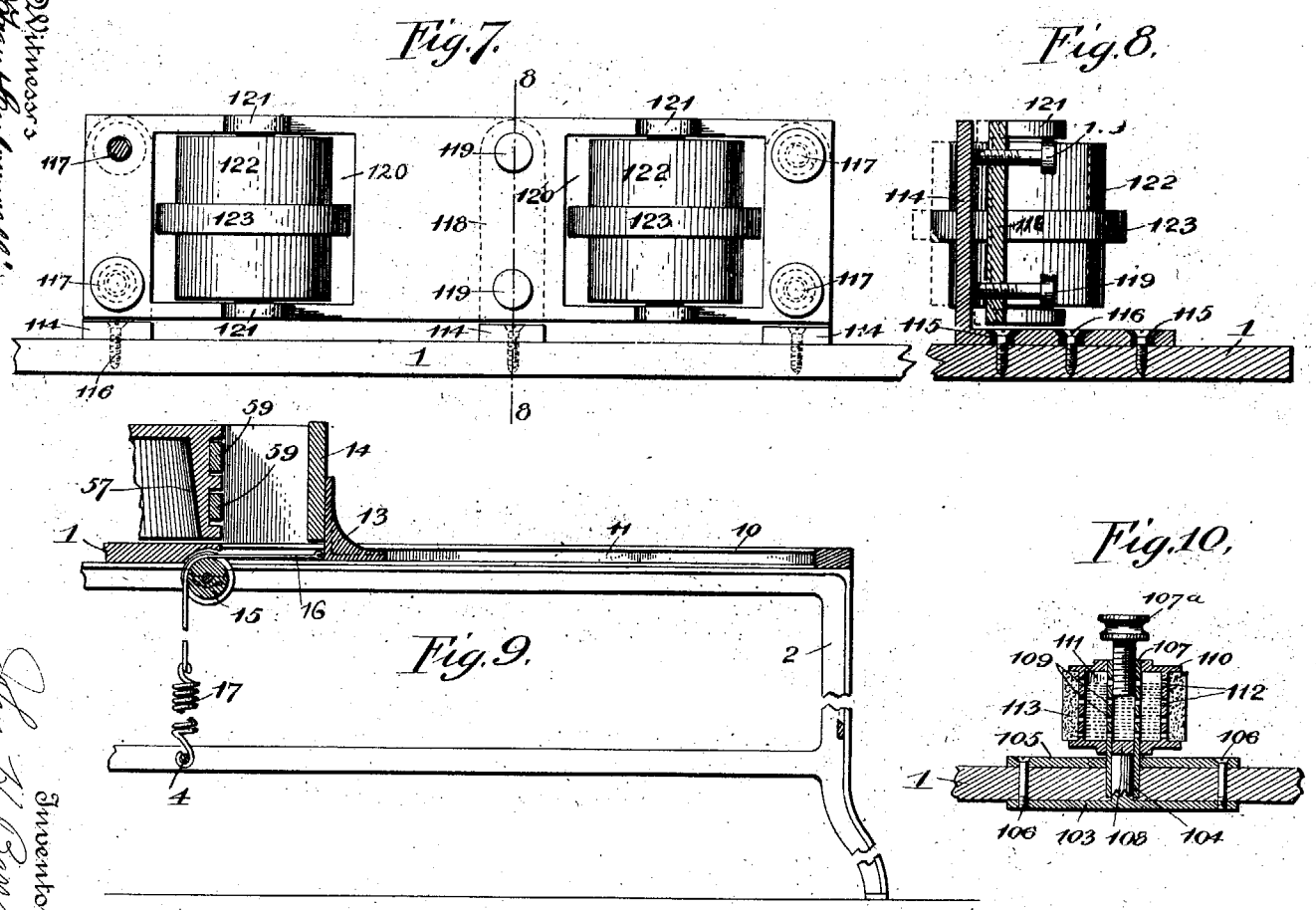
Witnesses
J. Grant Culverwell.
Arthur L. Bryant.
Inventor
John H. Barr
By H. H. Bliss
Attorney No. 12,505. REISSUED JULY 17, 1906.

J. H. BARR.

POSTMARKING AND STAMP CANCELING MACHINE.

APPLICATION FILED SEPT. 30, 1897.

5 SHEETS—SHEET 5.

Witnesses
J. Frank Culverwell,
Arthur L. Bryant

Inventor
John H. Barr
By H. H. Bliss
Attorney

UNITED STATES PATENT OFFICE.

JOHN H. BARR, OF KANSAS CITY, KANSAS, ASSIGNOR, BY DIRECT AND MESNE ASSIGNMENTS, TO THE BARR-FYKE MACHINE COMPANY, OF JACKSON COUNTY, MISSOURI.

POSTMARKING AND STAMP-CANCELING MACHINE.

No. 12,505. Specification of Reissued Letters Patent. Reissued July 17, 1906.

Original No. 573,128, dated December 15, 1896. Application for reissue filed September 30, 1897. Serial No. 653,656.

*To all whom it may concern:*

Be it known that I, JOHN H. BARR, a citizen of the United States, residing at Kansas City, in the county of Wyandotte, State of Kansas, have invented a new and useful Machine for Postmarking and Stamp-Canceling Letters, of which the following is a specification.

My invention relates to postmarking and stamp-canceling machines.

The object of the invention is to produce a machine of this character whereby postal cards or letters may be canceled, postmarked, and dated with much greater rapidity and accuracy than can be accomplished in the ordinary manner, and consequently in order to facilitate and render the distribution of mail more reliable.

A further object is to produce a machine of this character which is simple, durable, and comparatively inexpensive of manufacture and entirely automatic in action.

With these objects in view the invention consists in certain novel and peculiar features of construction and organization of parts, as will be hereinafter described, and pointed out in appended claims.

In order that the invention may be fully understood, I will proceed to describe it with reference to the accompanying drawings, in which—

Figure 1:
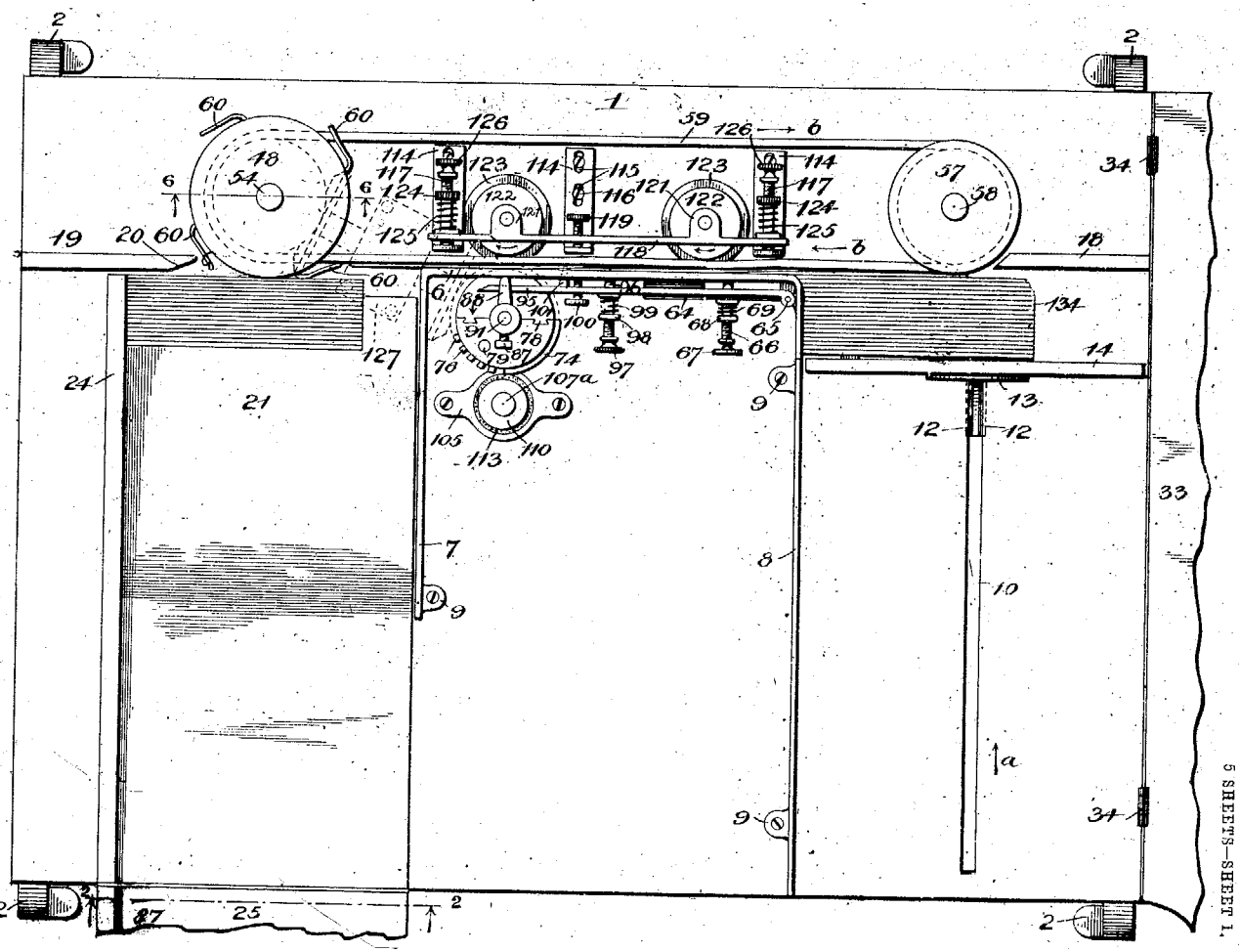
Figure 2:
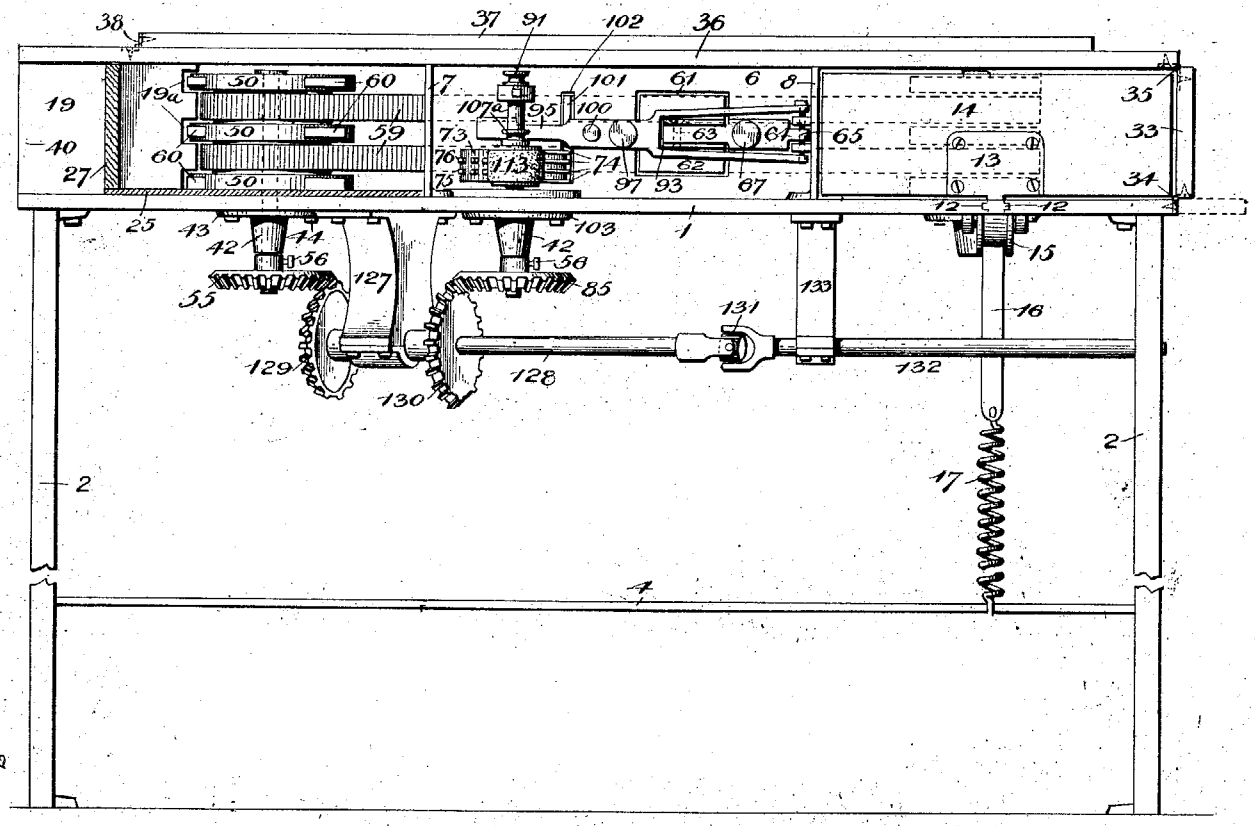
Figure 12:
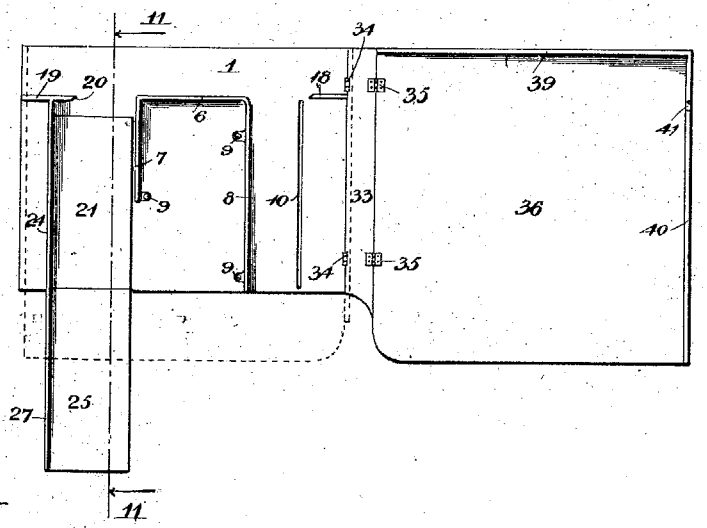
Figure 11:
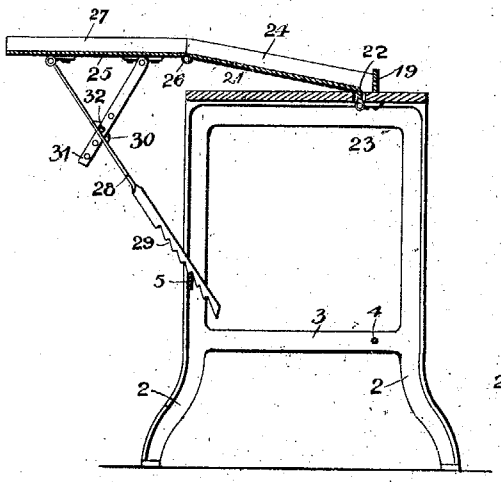

Figure 1 represents a plan view of a machine embodying my invention. Fig. 2 represents a section taken on the line 2 2 of Fig. 1. Fig. 3 represents a plan view, on an enlarged scale, of part of the machine. Fig. 4 represents a plan view of a stamping-cylinder, part of the same being omitted. Fig. 5 represents a vertical section taken on the line 5 5 of Fig. 4, in which said omitted part of Fig. 4 appears. Fig. 6 is a vertical section taken on the line 6 6 of Fig. 1 on an enlarged scale. Fig. 7 is a rear face view of a spring-actuated guide-roller-carrying plate. Fig. 8 is a vertical section taken on the line 8 8 of Fig. 7. Fig. 9 is a vertical section taken longitudinally through the slot of Fig. 1. Fig. 10 is a vertical sectional view, on an enlarged scale, of the inking-roller for the stamping-cylinder. Fig. 11 is a vertical section of the entire framework of the machine, taken on the line 11 11 of Fig. 12. Fig. 12 is a top plan view of such framework.

Like numerals refer to corresponding parts in all the drawings.

In the said drawings, 1 designates a horizontal table or platform, which preferably is mounted upon supporting-legs 2 of any suitable or preferred configuration that the machine as a whole may be conveniently portable. The end legs of the machine are preferably connected by brace-rods 3, and said bars near their rear ends are connected by a rod 4. The front legs about midway their height are also connected by a rectangular bar 5, the object of which will be hereinafter referred to.

6 designates a guide-plate, which is about one-third the length of the table and extends parallel with the front and rear margins thereof, but much nearer the latter, preferably. It is also disposed with its ends about equal distances from the adjacent ends of the table, and extending forwardly at right angles from the same are the parallel guide-arms 7 and 8, 7 extending about half-way to the front margin and 8 flush with said margin. Said arms are provided with lugs or ears 9, through which screws or other securing devices engage the table, and thereby hold said guide-plate and guide-arms securely in position. Extending parallel with and about midway between the arm 8 and the adjacent end of the table and of about the same length as the former is the guide-slot 10 of the table, and the opposite edges of said slot are grooved, as shown at 11, in order to receive and retain from accidental displacement the flanges 12 of the casting 13. Said casting is secured to the outer side of and carries the follower-board 14, which in length about equals the distance between the guide-arm 8 and the adjacent edge of the table for a purpose to be hereinafter described.

Journaled below the table at the rear end of the slot in any suitable manner is a guide-pulley 15, and guided around said roller is a belt or cord 16, which is attached at one end to the casting 13 and at its opposite end to a retractile spring 17, said spring being attached at its lower end to the rod 4 of the framework or at any other suitable or convenient point. Thus it will be seen from the foregoing that the tendency of said spring is to move the follower from the front toward the rear end of the table and that said follower may be moved outwardly only by tensioning said spring.

18 designates a fixed guard-board, which extends parallel with the follower and has its inner end adjacent to but slightly rearward of the plane represented by the guide-plate 6. At the opposite end of the table is arranged a second guard-board 19, which extends in longitudinal alinement with the plate 6 and has its inner end beveled rearwardly in order to deflect any mail-matter which may come in contact with it toward the front, as hereinafter more particularly referred to.

I will now describe the delivery-table construction or that upon which the stamped, postmarked, and dated letters are deposited automatically by the machine and ready for the distributing-clerk. Said table is preferably in two sections and is arranged at the outer side of the arm 7 and above the table 1, its relative position to which may be changed at any time desired. The inner section 21 has its rear end curved downwardly, as at 22, through a slot in the table which extends parallel with but slightly forward of the guard 19 and is hinged or pivoted, as at 23, below the table. The inner edge of said table is adjacent to the arm 7, while the outer edge is provided with a vertical flange 24, against which the letters will be automatically stacked by the machine. The outer section 25 is hinged to the inner section, as shown at 26, and at its outer edge is provided also with a flange 27. The inclination of both sections relative to the table 1 may be varied by means of the inclined brace 28, which is pivoted to the outer section and is provided with a series of teeth 29, one or the other of which may engage the rectangular bar 5, hereinbefore described. Said brace is provided at a suitable point with a lug 30, and extending adjacent thereto is a second inclined brace 31, which is provided with a series of apertures and is pivoted at its upper end to the outer section near its hinge-point. By causing one of said apertures to register with an aperture (not shown) in said lug and fitting therein a pin 32 the inclination of said sections relative to each other may be varied. It is obvious, of course, that other means than these braces may be used to adjust said sections relative to each other and to the table 1.

33 designates an end board which is hinged, as shown at 34, to the end of the table adjacent to the slot 10, and 35 designates hinges which connect said end board with a cover 36, which is adapted when the machine is not in operation to inclose all of the operative parts, and thereby prevent the entrance of dust to the same. At its rear edge and at its outer edge it is provided with depending flanges 39 and 40, respectively, which are adapted to rest upon the table, and said flange 40 is notched, as shown at 41, to fit over the guard-board 19 in order that the cover may fit snugly down upon the guide-plate 6 and arms 7 and 8 and that its flanges may rest squarely upon the table. When thus closed, the end board 33 is vertical, and the supporting-legs 37 of said cover, which are hinged to the same, as shown at 38, rest upon the upper side of the same, as illustrated in Fig. 2. They are hinged in such manner that when the cover is swung open they assume naturally a vertical position and support it.

Arranged about centrally of the delivery-table hereinbefore described and a suitable distance rearward of the plane represented by the plate 6 and projecting vertically up through the table 1 is a longitudinal bearing-sleeve 42, provided with a flange 43, which is secured by screws 44 to the under side of the table, and journaled rotatably in said sleeve is a shaft 45, which projects some distance above the upper end of said sleeve. The upper portion of said shaft is bored out, so as to form the chamber 46, for a purpose to be hereinafter explained, and is provided just below the upper end of said sleeve with one or more apertures 47, which communicate with said chamber 46.

48 designates a hollow wheel, which is peripherally grooved, as shown at 49, and is provided above and below said grooves with the peripheral flanges 50. The upper end of said wheel is closed by a head 51, and depending from the same is a hub 52, which embraces the upper end of the shaft and is secured rigidly thereon by the set-screw 53. The upper end of the hollow portion of the shaft is closed by a screw-plug 54. When it is necessary or desirable to lubricate the journal of said shaft, the said screw-plug is removed and the lubricating material, of such consistency as to prevent its rapid escape, is poured into the hollow portion of said shaft, whence it escapes slowly by way of the aperture or apertures 47 to the journal. The upper end of the shaft is then reclosed by the screw-plug. The lower end of said shaft projects below the sleeve 42 and has secured rigidly thereon the miter gear-wheel 55 by means of the set-screw 56. Arranged near the opposite end of the table, about centrally of the space between such end and the guide-arm 8 and the same distance from the rear margin of the table as the wheel 48, is a similar wheel 57. This wheel is of precisely the same construction and arrangement as the wheel above described, except that the peripheral grooves are not so deep. The upper end of its shaft, which is also similar in all respects to the shaft above described, except that it carries no gear-wheel upon its lower end, is closed by a similar screw-plug 58, whereby lubricating material may be conveniently inserted, and said wheels are connected by the traction or friction belts 59, preferably of rubber or of equivalent material, said belts in thickness being preferably equal to the depth of the flanges of the wheel 57, but not of the flanges of the wheel 48, as indicated clearly in Fig. 1.

The wheel 48 is also provided with a series of deflecting arms 60, which project from the flanges 50 in the direction opposite to the rotation of the wheel, and in order that said flanges may pass the guard-arms 19 without contact without necessitating that such arm shall be remote from the periphery of the wheel it is provided with a series of notches 19ª, as illustrated clearly in Fig. 2. The front portion of the belts 59 are arranged adjacent to the rear face of the guide-plate 6, and formed in said guide-plate is an opening 61, preferably rectangular, as shown, which opening from top to bottom is about equal to the distance between the upper margin of the top belt and the lower margin of the bottom belt, and fitting in such opening is a presser-foot 62, which is secured, as shown at 63, Fig. 3, upon the free end of a short lever 64, pivoted to a fixed point of the framework, as shown at 65. Said lever is provided with an opening, through which loosely projects the threaded post 66, and screwed upon its outer end is a head or enlargement 67. Adjustably mounted upon said threaded post inward of said head is a nut 68, and spirally encircling the post and bearing at its opposite ends against said nut and the outer end of said lever is an expansion-spring 69, the function and tendency of which are to hold the presser-foot rearward with a firm yet yielding pressure. The presser-foot is furnished, preferably at its rear side, with a pad 70, of rubber or equivalent material, and at its right-hand end when viewed from the front of the machine is beveled forwardly that the corresponding end of such pad may present an inclined surface toward the advancing mail-matter, which will be referred to more particularly in the description of the operation of the machine.

To the left of the opening 61 the guide-plate 6 is provided with a second opening 72, and projecting into said opening to about the plane of the rear side of said plate is the stamping-cylinder 73. Said cylinder 73 is provided peripherally for a suitable distance with a series of canceling-bars 74, which preferably extend horizontally, so as to print in straight parallel lines and rearward of said bars with respect to the rotation of the cylinder with a series of horizontally-alined and preferably integrally-formed type 75, which type are adapted to postmark the mail-matter passing through the machine—*i. e.*, to print upon said matter the name of the station where the machine is located—such, for instance, as "Kansas City, Missouri." Above said type are formed a corresponding series of radial recesses, in which fit a second series of type 76, and to prevent the accidental disarrangement or displacement of said type they are provided with dowel-pins 76ª, engaging recesses in the cylinder, and are held reliably in such position by means of the plate 77, which is dovetailed vertically into the cylinder, as shown at 78, and is secured in such position by means of the set-screw 79, as illustrated most clearly in Fig. 5. By this construction it is apparent that the date may be changed in a few moments' time, it being only necessary to remove a single set-screw and elevate the plate 77 bodily from position in order to remove the type 76 and replace the same with others. The plate 77 can be resecured with as little difficulty and in a moments' time. Said cylinder is secured rigidly by the set-screw 80 upon the vertical shaft 81, journaled rotatably in the bearing-sleeve 82, secured to the table by means of the underlying flange 83 and the screws or equivalent devices 84. Mounted upon the lower end of said shaft is a miter gear-wheel 85 of the same diameter as the miter-gear 55, hereinbefore described, and 86 designates a set-screw for securing said wheel rigidly in position upon the shaft. The set-screw 87 is applied to secure rigidly upon the upper end of said shaft, which projects some distance above the printing-cylinder, the arm 88, and depending from the outer end of said arm is a screw-bolt 89, upon which is mounted rotatably the antifriction-roller 90. The upper end of the shaft 81, like the shaft 45, is hollow, and it is provided also with an aperture or apertures 81ª to conduct the lubricating material to the journal. Its upper end is also closed by a screw-plug 91, as shown.

92 designates a lever which is pivotally mounted at one end coincidently with the pivoted end of the lever 64, as at 65. It is arranged rearward of the shaft 81 and projects to the opposite side of the same a slight distance. At its pivoted end it is bifurcated or forked, as shown at 93, in order to permit of the independent adjustment of the presser-foot mechanism and of adjustment independent of such mechanism. It occupies a plane a suitable distance above the stamping-cylinder, and its upper margin at its free end projects a suitable distance above the lower end of the antifriction tripping-roller 90, and such projecting portion or shoulder is beveled at its inner side, as shown at 94 in dotted lines, Fig. 3. In order, however, that the antifriction-roller may come in contact with the inner side of said lever, and thereby operate the same periodically, it is provided with a notch 95 in its upper side and inward of said shoulder, through which a roller may pass freely once in each complete evolution of the stamping-cylinder. Outward of the free end of the presser-foot mechanism the post 96 projects forwardly and loosely through an opening in the trip-lever 92, and screwed upon the front end of the same is the head or enlargement 97. Adjustably mounted upon the threaded portion of said post is the nut 98, and spirally encircling the post and bearing at its opposite ends against the nut 98 and said lever is the expansive coil-spring 99, the function and tendency of which are to hold the trip-lever rearwardly with a yielding pressure. To limit the rearward movement of said lever, due to the action of said spring, the lever carries adjustably the set-screw 100, which is adapted to come into contact with the front face of the guide-plate. Outward of said set-screw the lever is also provided with the rearwardly-projecting plate or arm 101, which under the action of said lever is alternately projected through an opening 102 in said guide-plate and withdrawn from the same.

The function of the spring 99, as hereinbefore observed, is to move the lever rearward, and thereby project the plate or arm 101 through said opening 102, while the function of the roller-carrying arm 88 is at regular intervals of time to move said lever outward, and consequently withdraw said plate or arm, hereinafter termed the "time-stop," from said opening. Said time-stop is employed to check the advance of each letter or card passing through the machine until such time as the stamping-cylinder has assumed its proper relative position to the same—that is, until such time as the canceling-bars shall be in position to engage the front or stamped end of the letter or card as it advances through the machine. It is necessary, therefore, as will be readily understood, that the letter or other mail-matter be placed in the machine with their stamped ends advanced in the direction which they are to travel, and it is also as the machine is constructed necessary that they be inverted in order that the canceling-bars shall contact with them at the proper point, as it will be noticed that the stamping-cylinder is disposed only a slight distance above the table by reference particularly to Figs. 2 and 5. This arrangement of the stamping-cylinder of course may be varied as occasion or the matter to be acted upon may demand.

Arranged forwardly of the stamping-cylinder and projecting upwardly through the table from a plate 103, secured to the under side of the same, is a cylindrical stud 104, the diameter of which is somewhat less than the diameter of the opening through which it projects. A plate 105 is secured by the same screw-bolts 106 which secure the plate 103 in position upon the upper side of the table and is provided with a circular opening which registers with the opening in the table and surrounds the stud 104.

107 designates a tubular shaft, which is mounted rotatably upon the stud 104 and projects downwardly into the openings formed by the table and the plate 105 in order to maintain it more effectually in such vertical position. Said tubular shaft is provided with an internal liquid-tight partition 108, which rests rotatably upon said stud 104, and above said partition said shaft is perforated, as shown at 109. 110 designates a hollow cylinder which is mounted rigidly upon said shaft and entirely surrounds the perforated portion of the same. It is made hollow, so as to provide practically an ink well or chamber 111, which communicates with the hollow shaft by way of the apertures 109. Said cylinder is also provided with apertures 112 in its vertical wall and is peripherally grooved to receive the ink-absorbing and ink-transferring material 113. To supply this well, the ink is poured into the shaft in suitable quantity, and then the upper end of said shaft is closed by the screw-plug 107[a]. The ink employed as it thickens by reason of evaporation or any other cause must be caused by pressure occasionally increased to pass to the surface of the ink-distributing material 113, and in order to accomplish this I have provided the adjustable set-screw 107[a], which as it is screwed farther down into the shaft exerts a pressure upon the ink contained in the cylinder, which, having an outlet via the absorbent material only, will keep the latter in proper condition for inking the printing-surfaces of the stamping-cylinder, with which it is periodically in contact, as illustrated more clearly in Fig. 1.

As it is necessary to oppose the positive pressure exerted by the presser-foot and by the stamping-cylinder with a firm yet yielding pressure and at the same time to hold the front or mail-carrying portion of the endless belts 59 approximately parallel with the plate 6, I provide mechanism constructed as follows: 114 designates a number of angle-plates—three in this instance—the central one of which is located opposite the time-stop 101 and the others opposite the ends of the plate 6. All of them are located, preferably, between the parallel strands of the belts, as illustrated in Fig. 1. They are each provided in their horizontal portions with longitudinal slots 115, which are engaged by screws 116, whereby they may be clamped at any point within their adjustment. This is done in order to accommodate mail-matter of varying thickness. Projecting horizontally and rearwardly from the vertical arms of the two end brackets are the cylindrical guide-posts 117, which are screw-threaded at their rear ends, and mounted slidingly upon said posts is the plate 118, which plate extends parallel to the plate 6. Said plate is provided with one or more set-screws 119, which project through the same and by contact with the vertical arm of the middle or third angle-bracket limit the forward movement of said plate, as illustrated clearly in Figs. 1 and 8. The plate 118 is provided at points opposite the beveled end of the presser-foot and opposite the stamping-cylinder with rectangular openings 120, and journaled in lugs 121, projecting from said plate, are the spindles or rollers 122, which occupy the openings 120. Said rollers are of such diameter that their peripheral faces are in the same plane with the inner sides of the front portions of the belts 59, as also shown clearly in Fig. 1; but centrally they are provided with the peripheral flanges 123, which are about equal in depth to said belts and projecting forwardly between them, so as to cause the bearing-surfaces of the mail-matter to resist in a suitable degree the pressure of the presser-foot and of the stamping-cylinder.

124 designates nuts which are suitably mounted upon the threaded posts 117, and rearward of the same are screwed upon said posts the heads or enlargements 126. Forward of the same and spirally encircling said posts are the coil-springs 125, which bear against said nuts and against said plate 118, so as to hold the rollers 122 advanced with a pressure which is firm and yet will yield to an overcoming pressure, such as is applied by the passage of a more or less bulky letter or by the positive pressure of the stamping-cylinder. Bolted to the under side of the table, as shown or in any other suitable manner, is the bearing 127, in which is journaled the shaft 128, and mounted rigidly upon said shaft are the miter gear-wheels 129 and 130, which mesh, respectively, with the miter gear-wheels 55 and 85, and thereby rotate the belt-wheel 48 and the stamping-cylinder at a corresponding speed, and as said wheel and cylinder are of equal diameter the belts travel also at a corresponding speed with the rotatable movement of said cylinder, the belts being driven by traction or frictional engagement upon said wheel. The shaft 128 is also preferably universally jointed, as shown at 131, to the shaft 132, which shaft is journaled in the pendent bearing 133 and also may find a bearing at any other convenient point. This shaft is driven at a predetermined speed by any suitable motive power desired, such as an electric motor. (Not shown.)

In practical operation after the operative parts of the machine are arranged as shown in Fig. 1 and set in motion the letters 134, inverted and with their stamped ends advanced as hereinbefore explained, are stacked edgewise upon the right-hand end of the table against the guide-arm 8. They are interposed between the corresponding end of the front portion of the belts and the spring-actuated follower 14, which has been withdrawn for this purpose and then released, so that the spring exerts a continuous but yielding pressure in the direction indicated by the arrow *a*, Fig. 1. Immediately such pressure makes itself felt the traction of the belts traveling in the direction indicated by the arrows *b*, same figure, causes all of the letters rearward of the plate 6 (which number is determined, of course, by the width of the space between said plate and the belts) to advance and assume substantially the relative positions shown in Fig. 3—that is, they will be overlapped in a greater or less degree, and this overlapping and separating of the letters or cards is accomplished more effectually by reason of the beveling of the face of the plate 6, as shown at $6^a$, so that in practice only about two letters, the first and the second, will be in contact simultaneously with the presser-foot, and one of them, or the second, by coming in contact with the beveled end of such foot will be positively and reliably held from further advance movement until the rear end of the other has completely cleared or passed in advance of the advanced end of such letter held stationary. The pressure between the presser-foot and the belts is gaged to admit of the passage of only one letter or card at a time, and if such letter be of unusual bulk or thickness the spring-actuated roller-carrying plate or the presser-foot, or both, together with the belts, will slightly yield to accommodate its passage. Immediately it clears the advanced end of the presser-foot it, together with the belt, bends forwardly, as indicated in Fig. 3, and the letter continues forward until it comes in contact with the time-stop 101, which at this instant may be projecting through the opening 102. Such time-stop holds it stationary for an instant (or, in fact, seems in practice only to check its speed, with such rapidity will the machine operate) until the depending roller or arm 88 of the shaft of the rotating stamping-cylinder passes through the notch 95 and engaging the free end of the lever 92 moves the same outwardly and trips the time-stop at the same instant that the canceling-bars upon said cylinder are disposed opposite the end of the latter, which immediately continues on its journey, and as it passes between said stamping-cylinder and the second roller of the plate 118 the stamp receives the impression of said canceling-bars, and the body of the letter inward of the stamp receives the postmark-impression and the date-impression from the series of type 75 and 76, respectively, as will be readily understood. Of course as said canceling-bars and type project beyond the periphery of the wheel the positive pressure exerted by them upon the letter will cause the opposing roller, together with its carrying-plate, to yield rearwardly and again advance immediately such disconnection takes place, so that the belts will continuously exert frictional pressure against the letters which pass successively through the machine. By this arrangement of the time-stop mechanism it is obvious that it is immaterial whether the letters be of the same or of varying lengths, as the canceling, postmark, and date impressions will always be made at proper points upon the letters, provided they be inserted properly in the machine.

It is obvious, of course, that the circumference of the stamping-cylinder should exceed the length of the longest letter to be acted upon, because if all the letters were of equal length with the circumference of the stamping-cylinder the time-stop mechanism would not be necessary. I prefer, however, to employ it, as the action of the machine will thereby be made more positive and reliable, and it will positively insure that each letter will receive the impression at the proper point. The machine may be made to print at a certain point upon the letter by adjusting the crank-arm 88 of the stamping-cylinder shaft or by rotating the disk of the shaft, as will be readily understood. Each letter as it successively emerges from between the stamping-cylinder and the opposing roller engages the periphery of the flanges 50 or is engaged by one of the deflecting-arms projecting from such flanges. In either case the free end of the letter is bent forwardly, so that it cannot by any possibility follow the belt, and is forced upon the inner section 21 of the delivery-table, which is inclined, as shown, in order that the letters may continue in a substantially vertical position or edgewise. The arms upon said wheel are principally for the purpose of moving each letter bodily a sufficient distance forward to prevent the succeeding letter interfering with it before it has assumed its proper relative position to those that have gone before. The letters will maintain substantially a vertical position, because they are fed with great rapidity upon the table, and each succeeding one supports the preceding one and is supported in turn by those that follow after, so that as each additional letter is added to the stack the preceding ones are fed bodily forward until the whole delivery-table may be filled. The table is made as illustrated in order that it may be inclined more or less, according to the rapidity with which the machine operates, and also of large capacity in order to give the operator time, while the letters are accumulating thereon, to recharge the following board with unstamped letters or postal cards, as the case may be. Thus it will be seen that one person can attend successfully to the machine and keep it in constant operation as long as the supply of letters or cards holds out and also that I have produced a machine which will greatly facilitate the distribution of mail and at the same time make it practically impossible for uncanceled letters to issue from the office.

While I have described and illustrated a particular construction, it is obvious that various minor changes may be made in such construction and in the arrangement of the parts without departing from the essential spirit and scope or sacrificing any of the advantages of my invention.

It will be seen that the present machine differs essentially from each and all of the machines heretofore made or proposed for this purpose. The earlier ones have each been of one or the other of the following classes: The first class comprises those each of which has had an intermittingly-acting device for initially starting the letter in its travel toward the printing mechanism, such intermittingly-acting device being either rotary and of the nature of a cam or being reciprocating—that is, moving back and forth on straight lines or moving forward and back over the same path. The second class includes those in which use has been made of a series of separated pairs of feeding-rolls either arranged on one line or arranged in pairs, or both, each roll having a gap or open space between it and the next one in series. The third class comprises those in each of which use has been made of an endless feeding-belt, sometimes so arranged that the letter rested facewise on the belt and sometimes so that it rested with its edge thereon; but I am not aware of any instance prior to my invention in which use was made of a belt having a substantially smooth unbroken continuous surface adapted to be brought into contact and firm engagement with one of the flat faces of the letter over its entire length and press the letter against an abutment or wall, the endless traveling surface being so disposed with respect to adjacent parts that a powerful friction-grip could be exerted by its unbroken surface and the belt being so arranged that an ingoing pack of letters could be pushed directly toward its active surface, any part of the latter being adapted to instantly engage with the innermost letter of the pack and carry it away from those behind it and advance it to the stop and past the printer.

Having thus described the invention, what I claim as new, and desire to secure by Letters Patent, is—

1. A mail-stamping machine, comprising a suitable table structure, a guide-plate fixed thereon, an endless traveling belt arranged opposite to and projecting beyond each end of said plate, a follower forcing letters stacked edgewise successively into frictional contact with said belt at one end of said plate, which conveys them through the passage formed between the same and the plate, means to force them forwardly and away from said belt after they have emerged from said passage, and a delivery-table superposed relative to the first-named table and inclined upwardly and forwardly to receive said letters as they are forced forward and maintain them in a substantially upright position, substantially as set forth.

2. In a mail-stamping machine, the combination of a pair of superposed table structures, the upper one being arranged at an angle to the lower and at its rear end extending through a slot in and pivoted below said first-named table, substantially as set forth.

3. In a mail-stamping machine, the combination of a pair of superposed table structures, the upper one being arranged at an angle to the lower and at its rear end extending through a slot in and pivoted below said first-named table; said table being formed in two sections hinged together, a brace pivoted to the outer section and provided with teeth to engage a part of the first-named table structure, and a brace extending at an angle to the same whereby said sections may be disposed at an angle to each other, substantially as set forth.

4. A mail-stamping machine, comprising a suitable table structure, a plate fixed thereon, an endless traveling belt mounted adjacent to and opposite said plate and held with a yielding pressure adjacent to and opposite said plate in order that it may by friction convey mail successively past the face of said plate, a lever pivoted upon the framework and provided with a time-stop arm, and with a notch outward of the same, a spring to hold said time-stop arm normally projected through an opening in said guide-plate to check the passage of the mail, a rotating stamping-cylinder to make the required impression upon each letter, and a roller-carrying arm projecting from the shaft of said cylinder and arranged to pass through said notch and trip said time-stop by operating the lever at a predetermined time in each revolution, substantially as set forth.

5. A mail-stamping machine, comprising a suitable table structure, a plate fixed thereon, an endless traveling belt mounted adjacent to and opposite said plate and held with a yielding pressure adjacent to and opposite said plate in order that it may by friction convey mail successively past the face of said plate, a lever pivoted to the framework and provided with a time-stop arm, and with a notch outward of the same, a spring to hold said time-stop arm normally projected through an opening in said guide-plate to check the passage of the mail, a rotating stamping-cylinder to make the required impression upon each letter, a roller-carrying arm projecting from the shaft of said cylinder and arranged to pass through said notch and trip said time-stop by operating the lever at a predetermined time in each revolution, and an adjustable set-screw to limit the spring-actuated movement of said lever.

6. A mail-stamping machine, comprising a suitable table structure, a guide-plate fixed thereon, belt-wheels mounted thereon, a pair of belts connecting the same and having their front portions extending adjacent to and opposing said guide-plate, a spring-actuated plate, rollers carried by said plate and bearing against the rear sides of said front portions of the belts, a presser-foot and a stamping-cylinder projecting through said plate and opposing said rollers and the interposed portions of the belts, and means to cause the rotation of the stamping-cylinder and one of said belt-wheels, and consequently the operation of said belts, substantially as set forth.

7. A mail-stamping machine, comprising a suitable table structure, a guide-plate fixed thereon, belt-wheels mounted thereon, a pair of belts connecting the same and having their front portions extending adjacent to and opposing said guide-plate, a spring-actuated plate, rollers carried by said plate and bearing against the rear sides of said front portions of the belts, set-screws to limit the forward movement of said roller-carrying plate, a presser-foot, and a stamping-cylinder projecting through said plate and opposing said rollers and interposed portions of the belts, and means to cause the rotation of the stamping-cylinder, one of said belt-wheels, and consequently the operation of said belts, substantially as set forth.

8. A mail-stamping machine, comprising a suitable table structure, a guide-plate secured thereon, a pair of belt-wheels each provided with two peripheral grooves, belts connecting said wheels and engaging said grooves, angle-plates secured to the table between the front and rear portions of said belts, guide-posts projecting rearwardly from the vertical portions of the same, a plate mounted loosely upon said posts, springs holding said plate yieldingly advanced, a set-screw to limit the advance movement of said plate, rollers journaled in said plate and projecting through the same and provided centrally with peripheral flanges which project between the front portions of said belts, a spring-actuated presser-foot projecting through the opening in said guide-plate and opposing one of said rollers, and a stamping-cylinder projecting through another opening in said plate, and opposing the other roller, substantially as set forth.

9. A mail-stamping machine, comprising a suitable table structure, a guide-plate fixed thereon, belt-wheels arranged at opposite ends of said guide-plate, endless belts connecting said wheels, one of which is provided with peripheral flanges which project outwardly beyond said belts, whereby the mail-matter, as it successively emerges from between said belts and said guide-plate, is deflected forwardly and away from the face of the belts, substantially as set forth.

10. A mail-stamping machine, comprising a suitable table structure, a guide-plate thereon, a pair of belt-pulleys, belts connecting the same and adapted to convey mail past the face of said plate, flanges upon one of said wheels which project beyond the outer sides of the belts, and a series of arms projecting from said flanges, which are adapted to force forward each letter as it emerges from between said belts and said guide-plate, substantially at set forth.

11. In a mail-stamping machine, the combination with a suitable table structure having an opening, a cylindrical stud projecting upwardly through said opening, a plate secured upon the table and provided with an opening which registers with the table-opening, a hollow shaft journaled upon said stud within the openings of the table and said plate, and a cylinder mounted rigidly upon said shaft and provided peripherally with an ink-absorbent pad, substantially as set forth.

12. In a mail-stamping machine, the combination with a suitable framework and a stub-shaft projecting therefrom, of a hollow shaft journaled upon said stud, and perforated above the same, a liquid-tight partition within said shaft below said perforations, a cylinder mounted rigidly upon said shaft and peripherally grooved and perforated, and an absorbent pad fitting in said groove and communicating by way of the aforesaid apertures with the ink contained within the perforated shaft and cylinder, substantially as set forth.

13. In a mail-stamping machine, the combination with a suitable framework, and a stub-shaft projecting therefrom, of a hollow shaft journaled upon said stud, and perforated above the same, a liquid-tight partition within said shaft below said perforations, a cylinder mounted rigidly upon said shaft and peripherally grooved and perforated, and an absorbent pad fitting in said groove and communicating by way of the aforesaid apertures with the ink contained within the perforated shaft and cylinder, and an adjustable plug closing the upper end of the perforated shaft, by which the ink may be forced through the apertures of the shaft and the cylinder, thus providing a presser-feed, substantially as set forth.

14. In a mail-stamping machine, the combination with a suitable table structure, a bearing-sleeve secured thereto, a shaft journaled in said sleeve and provided with a chamber in its upper portion and with an aperture connecting said chamber with the journal, and a screw-plug closing the upper end of said shaft, substantially as set forth.

15. In a mail-stamping machine, a stamping-cylinder provided peripherally with integral canceling-bars and postmarking-type, date-stamping type fitting in recesses in said cylinder and provided with dowel pins engaging recesses in the cylinder, a plate dovetailed upon the cylinder and overlapping said date-type, and a set-screw securing said plate firmly in position, substantially as set forth.

16. In a machine for stamp-canceling and postmarking letters, the combination of the endless belt having a smooth, substantially continuous, surface adapted to engage with one of the faces of each letter, a printing-couple, a letter-stop for arresting each letter, and a wall or holder for engaging with the face of the letter opposite to the belt, the belt being arranged to press the letters facewise against said wall while it is carrying them past the printer, substantially as set forth.

17. The combination of the driving-pulley, the driven pulley, the endless feeder-belt adapted to press against the faces of the letters, an abutment or opposing presser device in opposition to the belt, a printing-couple, and stacking devices for the outgoing letters secured to one of the said belt-pulleys, substantially as set forth.

18. The combination of the endless feeding-belt having a continuously smooth or unobstructed active surface, adapted to engage by friction with the face of a letter, an abutting surface acting in opposition to the belt to increase the pressure upon the letter, a printing-couple adjacent to the opposing or abutting surface, a belt-driving pulley engaging with the feeding-belt, and a supplemental belt-guiding pulley at the other end of the active portion of the belt, one of said pulleys being of larger diameter than the other and adapted to engage with and pack the outgoing canceled letters, substantially as set forth.

19. The combination of the endless feeder-belt having a substantially smooth or unobstructed active surface, an abutting surface acting in opposition to the active surface of the belt, said belt and abutting surface being adapted to grip the letters by pressure against the faces thereof, a letter-separator, a time-stop between the ends of the active part of the abutting surface, and a printing-couple between the said ends of said surface, said separator, stop and printing-couple being situated in that part of the path of the letter where it is gripped by the belt, substantially as set forth.

20. The combination of the printing-couple, the time-stop in advance of the printing-couple, the letter-separator in advance of the time-stop, the stacker for the outgoing canceled letters and the abutment or letter-pressing wall, and the traveling letter-carrying device having the endless substantially smooth or unobstructed letter-pressing active surface traveling continuously from the separator to the stacker past the time-stop and the printing-couple, substantially as set forth.

21. In a postmarking and stamp-canceling machine, the combination of a printing-couple, a letter-stop in advance of the printing-couple, an initial letter-feedway in advance of the letter-stop, and adapted to receive a pack of letters and to guide said pack on lines transverse to the line of passage through the printing-couple, a stacker on the opposite side of the printing-couple from the letter-stop, a letter-pressing abutment or wall adjacent to the printing-couple, and an endless traveling letter-feeding device, having a substantially continuous or unbroken letter-pressing surface, traveling continuously from the initial feedway to the stacker, past the stop and the printing-couple, and adapted to engage with the exposed face of the foremost letter of the pack in the said feedway, and move such letter from the feedway to the stacker without releasing its grip, substantially as set forth.

22. In a postmarking and stamp-canceling machine, the combination of a printing-couple, consisting of two members, a letter-stop at one side of said printing-couple, a letter-pressing abutment or wall adjacent to the printing-couple, and a traveling endless letter-feeding device having a substantially continuous or unbroken letter-pressing surface arranged to move across the vertical lines of the stops between the members of the printing-couple, and adapted to engage with the stops with the exposed face of a letter opposite the face pressed by the aforesaid abutment and to move such letter past the stop and between the members of the printing-couple, substantially as set forth.

23. The combination of the stationary wall having an abutting surface parallel to the letter-path and adapted to have the letters pressed facewise against said surface, a time-stop intermittingly projecting across the letter-path, a printing-couple between the ends of the said abutting surface, and an endless feeding-belt having a substantially smooth or unobstructed active surface arranged to press the letters against the aforesaid abutting surface and propel the letters while in contact with the abutting surface against said stop, and then the said printing-couple, substantially as set forth.

24. The combination of the printing-couple, the receiving-way on one side of the printing-couple, the letter-feeding way on the opposite side of the printing-couple, a letter passage-way from the inner end of the feeding-way to the receiving-way, and an endless feeding-belt having a substantially smooth or unobstructed active surface arranged to travel across more or less of the inner end of the feeding-way and across the transverse planes of the printing-couple, the feeding-way being arranged substantially as set forth to have a pack of several letters pressed forward in the planes of travel of the belt, whereby their inner faces can be successively pressed in parallelism with and against the active surface of the belt to start their travel successively transversely through the printing passage-way, substantially as set forth.

25. The combination of the printing-couple, the receiving-way, the letter-feedway on the opposite side of the printing-couple, and the endless feeding-belt having a substantially smooth or unobstructed active surface situated to have more or less thereof exposed at the inner end of the receiving-way directly to the end letter of the pack of outgoing letters, substantially as set forth.

26. The combination of the supporting-table having three sections consisting of a feedway-section with a vertical wall along its inner side, a receiving-way section with a vertical wall along its inner side, and an intermediate section between the two said inner side walls, and having an inner end wall, a printing-couple having its active devices adapted to move across the vertical planes of said inner end wall, a time-stop in advance of the printing-couple adapted to project across the letter-path, both said time-stop and printing-couple being between the ends of said inner end wall, a separator for feeding the letters singly allowing but one letter to pass at a time, and a letter-feeding mechanism having an endless letter-pressing substantially continuous surface arranged to press the letters against said inner end wall and to travel continuously in one direction to advance the letters to the time-stop and past the printing-couple, substantially as set forth.

27. The combination of a support for a pack of letters upon which the bottom edges of the letters rest having a feeding-way with a horizontal surface, for the ingoing letters, a receiving-way with a horizontal surface for the outgoing canceled letters, and a cross passage-way between the feeding-way and the receiving-way, having a horizontal surface, the said three surfaces being in substantially the same horizontal plane, a printing-couple, a time-stop in advance of the printing-couple for arresting each letter in series prior to reaching the printing-couple, and an endless belt extending past and having supporting means beyond said printing-couple, said belt having constant frictional engagement with the flat face of the letters in series while they are moving to, and are arrested by said stop, while they are moving past the said stop and the printing-couple and after they have passed the printing-couple, substantially as set forth.

28. The combination of the letter-support for the bottom edges of the letters having three sections substantially as described, consisting of a feedway-section, a receiving-way section and an intermediate relatively wide section, an inner wall for the intermediate section inclosing the inner end thereof, a side wall for the inner side of the feedway-section a side wall for the inner side of the receiving-way section, a printing-couple, a time-stop and a separator, all situated between the ends of the inner end wall of the intermediate section, and a letter-propelling feed device beyond or inside of said inner wall of the intermediate section and having a letter-passage between said inner wall and the feed device, and having an endless substantially continuous letter-pressing surface whereby the letters are first separated into a series, and are then while pressed against said inner wall arrested *seriatim*, and are then propelled *seriatim* past the printing-couple, substantially as set forth.

29. The combination of a printing mechanism, a transverse letter passage-way extending past the printing mechanism, a receiving-way extending at right angles to the letter passage-way, and along which the letters are pushed in a pack on straight lines, and an endless belt having its active surface exposed at the inner end of the receiving-way to exert pressure on the face of the end letter of the outgoing pack, substantially as set forth.

30. The combination of a printing mechanism, a time-stop, a stationary abutment-wall, extending across the space between said printing mechanism and stop and having one end projecting beyond the printing mechanism and its opposite end projecting beyond the time-stop, and a belt having a friction-surface arranged to press the letters against the said stationary abutment-wall throughout the length of said wall, substantially as set forth.

In testimony whereof I have hereunto signed my name, in the presence of two witnesses, this 12th day of August, 1897.

JOHN H. BARR.

Witnesses:

ARTHUR G. NOTEMAN,
EMMETT L. SNIDER.